(12) United States Patent
Ünlü et al.

(10) Patent No.: US 11,137,343 B2
(45) Date of Patent: Oct. 5, 2021

(54) APPARATUS AND METHOD FOR BIOMOLECULAR ANALYSIS

(71) Applicant: Trustees of Boston University, Boston, MA (US)

(72) Inventors: M. Selim Ünlü, Newton, MA (US); Celalettin Yurdakul, Brighton, MA (US); Allison Marie Marn, Somerville, MA (US)

(73) Assignee: TRUSTEES OF BOSTON UNIVERSITY, Boston, MA (US)

( * ) Notice: Subject to any disclaimer, the term of this patent is extended or adjusted under 35 U.S.C. 154(b) by 0 days.

(21) Appl. No.: 17/115,017

(22) Filed: Dec. 8, 2020

(65) Prior Publication Data

US 2021/0172863 A1    Jun. 10, 2021

Related U.S. Application Data

(60) Provisional application No. 62/945,925, filed on Dec. 10, 2019.

(51) Int. Cl.
*G01N 21/17* (2006.01)
*G01N 21/45* (2006.01)
(Continued)

(52) U.S. Cl.
CPC ......... *G01N 21/1717* (2013.01); *G01N 21/45* (2013.01); *G01N 2021/1776* (2013.01);
(Continued)

(58) Field of Classification Search
CPC .............. G01N 21/1717; G01N 21/45; G01N 2021/3181; G01N 2021/1776;
(Continued)

(56) References Cited

U.S. PATENT DOCUMENTS 6,020,959 A * 2/2000 Imura ...................... G01J 3/02
250/461.1
6,243,163 B1 * 6/2001 Wakabayashi ............ G01J 3/28
356/318
(Continued)

OTHER PUBLICATIONS

Barer, R., et al. "Refractive Index of Concentrated Protein Solutions" Nature Publishing Group, No. 4409 (1954).
(Continued)

*Primary Examiner* — Mohamed K Amara
(74) *Attorney, Agent, or Firm* — Burns & Levinson LLP; Steven M. Mills

(57) ABSTRACT

An apparatus, and method of operating the same, detects changes in biomass accumulating on a surface of a substrate while minimizing bulk effect. The apparatus includes a sensor substrate and two illumination sources. A first illumination source generates a first light having a first central wavelength. A second illumination source generates a second light having a second central wavelength different than the first wavelength. The first and second light are mixed to produce a combined light. An analyte solution is introduced to the sensor substrate. Incident light of the combined light is reflected from the sensor substrate to produce a signal. The signal is imaged with a camera to obtain a reflectance. Reflectance produced by the combined light is not affected by variations in the dielectric properties of the analyte solution. A biomass accumulated on the substrate is computed based on the reflectance.

26 Claims, 7 Drawing Sheets

(51) Int. Cl.
   *G01N 21/3563* (2014.01)
   *G01N 21/31* (2006.01)
(52) U.S. Cl.
   CPC .............. *G01N 2021/3181* (2013.01); *G01N 2021/3568* (2013.01)
(58) Field of Classification Search
   CPC .. G01N 2021/3568; G01J 1/44; G01J 1/0295; G01J 3/0297; G01J 3/28; G01J 1/0407; G01J 1/08; G01J 3/02; G01J 3/10; G01J 2001/083; G01J 2001/086; G01J 2003/2876; G01J 2003/2866; G01J 2001/0481; G01J 2001/444
   See application file for complete search history.

(56) References Cited

U.S. PATENT DOCUMENTS

| | | | | |
|---|---|---|---|---|
| 9,841,322 | B1* | 12/2017 | Kemeny | H04N 5/2256 |
| 2002/0127563 | A1* | 9/2002 | Salafsky | B82Y 30/00 435/6.12 |
| 2003/0011767 | A1* | 1/2003 | Imura | G01J 3/10 356/326 |
| 2003/0096302 | A1* | 5/2003 | Yguerabide | G01N 15/1468 435/7.1 |
| 2004/0233428 | A1* | 11/2004 | Hart | G01J 3/0254 356/319 |
| 2005/0041248 | A1* | 2/2005 | Imura | G01J 3/28 356/328 |
| 2005/0128475 | A1* | 6/2005 | Imura | G01J 1/08 356/300 |
| 2006/0066874 | A1* | 3/2006 | Ueki | G01B 9/02057 356/512 |
| 2008/0289765 | A1* | 11/2008 | Yokogawa | H01J 37/32935 156/345.29 |
| 2009/0226950 | A1* | 9/2009 | Cunningham | G01N 21/76 435/29 |
| 2010/0003743 | A1* | 1/2010 | Schulz | G01N 21/648 435/288.7 |
| 2012/0276549 | A1* | 11/2012 | Cunningham | B82Y 15/00 435/7.1 |
| 2012/0298194 | A1* | 11/2012 | Hergert | H01L 31/022466 136/256 |
| 2015/0009501 | A1* | 1/2015 | Sun | G01J 1/0462 356/405 |
| 2015/0109617 | A1* | 4/2015 | Gilbert | G01J 3/42 356/300 |
| 2016/0141166 | A1* | 5/2016 | Toriumi | H01J 49/0418 250/288 |
| 2017/0016821 | A1 | 1/2017 | Unlu et al. | |
| 2017/0254756 | A1* | 9/2017 | Tuunanen | G01N 21/76 |
| 2017/0365476 | A1* | 12/2017 | Mazur | H01L 21/2686 |
| 2018/0238845 | A1 | 8/2018 | Eliason et al. | |
| 2018/0364160 | A1* | 12/2018 | Aben | G01N 21/86 |
| 2019/0011251 | A1* | 1/2019 | Moeller | G01B 21/06 |
| 2019/0086416 | A1 | 3/2019 | Daaboul et al. | |
| 2019/0182440 | A1* | 6/2019 | Xin | G01J 3/10 |
| 2019/0226985 | A1* | 7/2019 | Roberts | G01N 21/314 |
| 2019/0233725 | A1* | 8/2019 | Matsuda | C09K 11/73 |
| 2019/0302007 | A1* | 10/2019 | Pelivanov | G01N 21/1702 |
| 2019/0361015 | A1* | 11/2019 | Mendes | G01N 21/648 |
| 2020/0096389 | A1* | 3/2020 | Ikemura | G01J 3/4406 |
| 2020/0182693 | A1* | 6/2020 | Kawasaki | G01J 3/10 |

OTHER PUBLICATIONS

Bio-Rad, "How to Perform Excluded Volume Correction on the ProteOn™ XPR36 Protein Interaction System." Bulletin 5822 Rev C. [https://www.bio-rad.com].
Boozer, Christina et al., "Looking towards label-free biomolecular interaction analysis in a high-throughput format: a review of new surface plasmon resonance technologies." Current Opinion in Biotechnology, 17:400-405 (2006). [https://www.sciencedirect.com]. DOI: 10.1016/j.copbio.2006.06.012.
Chiodi, Elisa, et al., "Highly Multiplexed Label-Free Imaging Sensor for Accurate Quantification of Small-Molecule Binding Kinetics." ACS Omega, 5, 25358-25364 (2020).
Cretich, Marina et al., "A new polymeric coating for protein microarrays." Analytical Biochemistry, 332: 67-74 (2004).
Daaboul, G.G. et al., "LED-based Interferometric Reflectance Imaging Sensor for quantitative dynamic monitoring of biomolecular interactions." Biosensors and Bioelectronics, 26, 2221-2227 (2011).
Dechancie, Jason, et al., "The Origins of Femtomolar Protein-Ligand Binding: Hydrogen-Bond Cooperativity and Desolvation Energetics in the Biotin-(Strept)Avidin Binding Site." J. Am. Chem. Soc., vol. 129, No. 17 (2007).
GE Healthcare Life Sciences, Biacore™ Assay Handbook 29-0194-00 Edition AA (2012).
Grassi, James H., et al., "Temperature-Dependent Refractive Index Determination from Critical Angle Measurements: Implications for Quantitative SPR Sensing." Anal. Chem., 71, 4392-4396 (1999).
International Search Report and Written Opinion for International Application No. PCT/US2020/063752 dated Mar. 2, 2021.
Karlsson, Robert, "Biosensor binding data and its applicability to the determination of active concentration." Biophys Rev. 8:347-358 (2016). DOI 10.1007/s12551-016-0219-5.
Kurihara, Kazuyoshi et al., "Theoretical Understanding of an Absorption-Based Surface Plasmon Resonance Sensor Based on Kretchmann's Theory." Anal. Chem., 74, 696-701 (2002).
Li, Ru et al., "Label-free amperometric immunosensor for the detection of human serum chorionic gonadotropin based on nanoporous gold graphene." Analytical Biochemistry, 414, 196-201 (2011).
Liu, Shike et al., "Measurement of the refractive index of whole blood and its components for a continuous spectral region." Journal of Biomedical Optics, 24(3), 035003 (2019). DOI: 10.1117/1.JBO.24.3.035003.
Lukosz, W., "Principles and sensitivities of integrated optical and surface plasmon sensors for direct affinity sensing and immunosensing." Biosensors & Bioelectronics, 6, 215-225 (1991).
Manjunath, Patil et al., "Pharmacology and Clinical Use of Dimethyl Sulfoxide (DMSO): A Review." International Journal of Molecular Veterinary Research, vol. 3, No. 6. 23-33 (2013). DOI: 10.5376/ijmvr.2013.03.0006.
Nikolovska-Coleska, Zaneta, "Studying Protein-Protein Interactions Using Surface Plasmon Resonance." Methods in Molecular Biology, vol. 1278 (2015). DOI: 10.1007/978-1-4939-2425-7_7.
Nguyen, Hoang Hiep et al., "Surface Plasmon Resonance: A Versatile Technique for Biosensor Applications." Sensors, 15, 10481-10510 (2015). DOI:10.3390/s150510481.
O'Brien II, Michael J. et al., "SPR biosensors: simultaneously removing thermal and bulk-composition effects." Biosensors & Bioelectronics, 14, 145-154 (1999).
Özkumur, Emre et al., "Quantification of DNA and protein adsorption by optical phase shift." Biosensors and Bioelectronics, 25, 167-172 (2009).
Özkumur, Emre et al., "Label-free and dynamic detection of biomolecular interactions for high-throughput microarray applications." PNAS, vol. 105, No. 23, (2008).
Piehler, Jacob et al., "Affinity Detection of Low Molecular Weight Analytes." Anal. Chem., 68, 139-143 (1996).
Pirri, Giovanna et al., "Characterization of A Polymeric Adsorbed Coating for DNA Microarray Glass Slides." Anal. Chem., 76, 1352-1358 (2004).
Schuetz, Doris A. et al., "Kinetics for Drug Discovery: an industry-driven effort to target drug residence time." Drug Discovery Today, vol. 22, No. 6 (2017).
Sevenler, Derin et.al., "Numerical techniques for high-throughput reflectance interference biosensing." Journal of Modern Optics (2015). DOI:10.1080/09500340.2015.1117668.
Yang, Danlin et al., "Determination of High-affinity Antibody-antigen Binding Kinetics Using Four Biosensor Platforms." J. Vis. Exp., 122, e55659 (2017). [https://www.jove.com/video/55659]. DOI: 10.3791/55659.

(56) References Cited

OTHER PUBLICATIONS

Zhao, Huaying et al. "A comparison of binding surfaces for SPR biosensing using an antibody-antigen system and affinity distribution analysis." Methods, 59, 328-335 (2013). [http://dx.doi.org/10.1016/j.ymeth.2012.12.007].

* cited by examiner

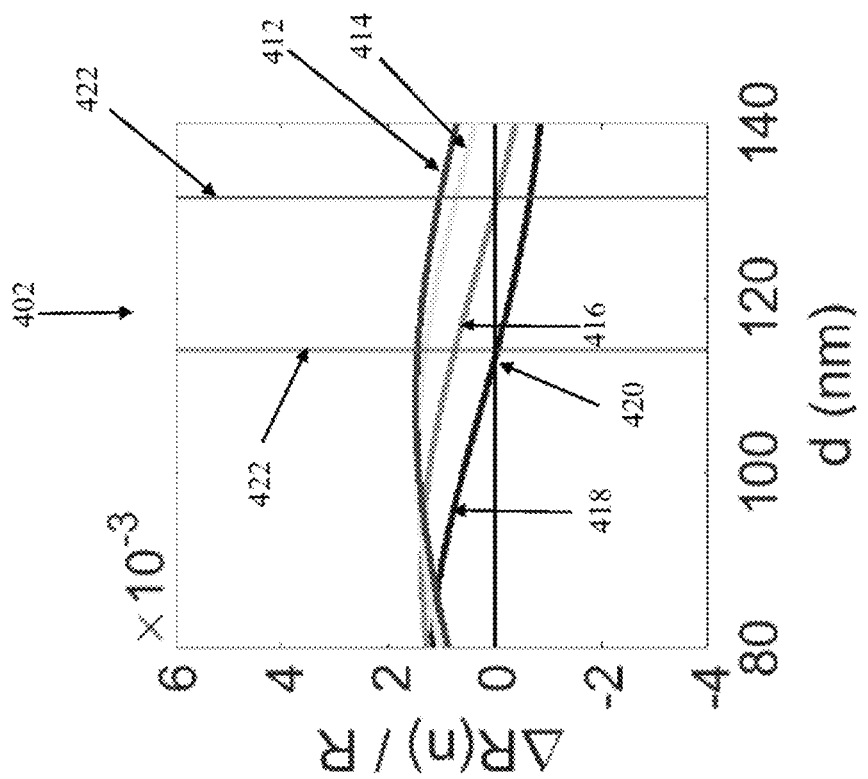
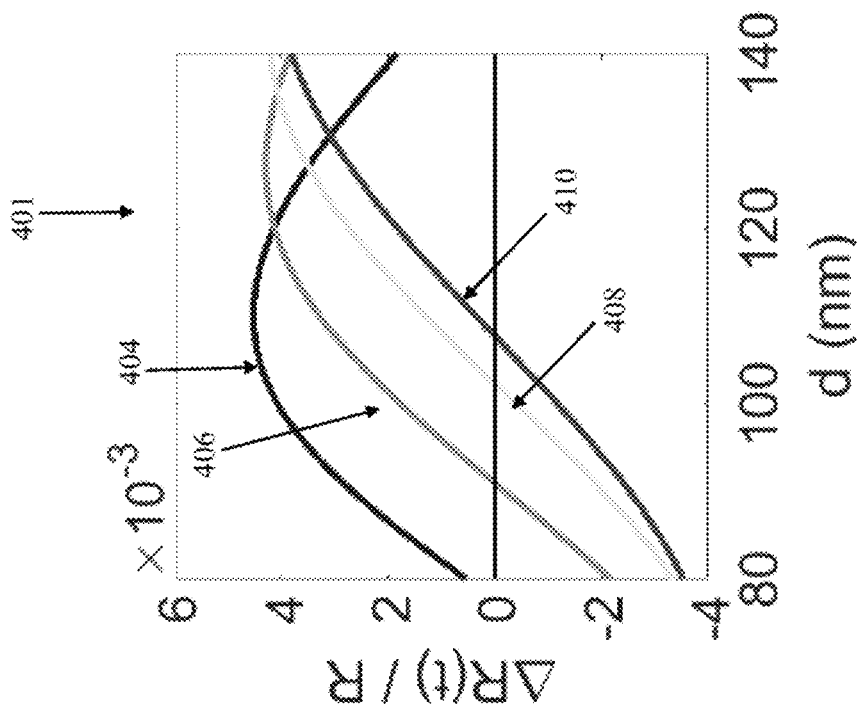
FIG. 4b
FIG. 4a

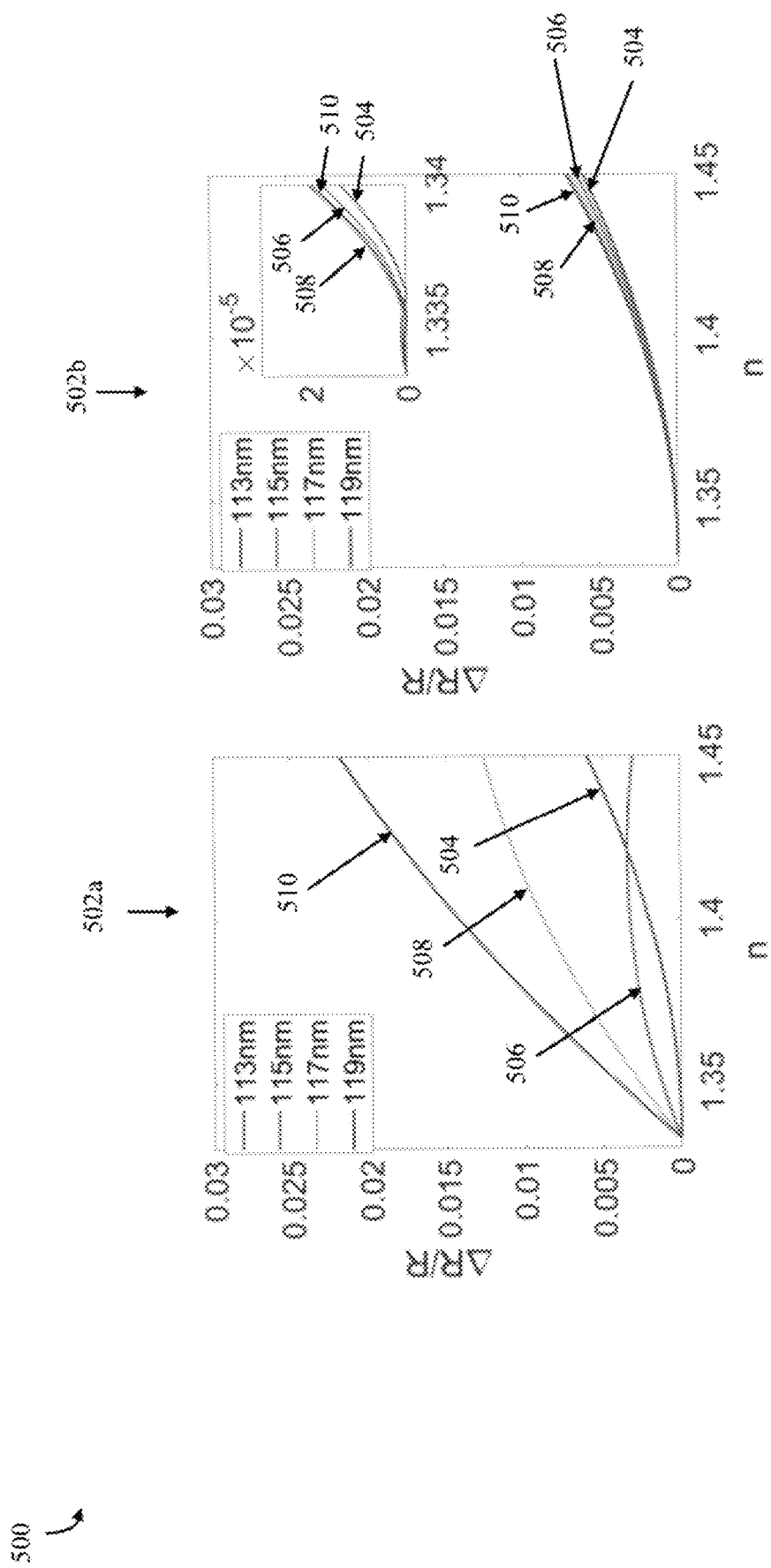

APPARATUS AND METHOD FOR BIOMOLECULAR ANALYSIS

CROSS REFERENCE TO RELATED APPLICATIONS

This application claims priority to and the benefit of U.S. Provisional Patent Application No. 62/945,925, filed on Dec. 10, 2019 and titled "OPTIMIZED INTERFEROMETRIC REFLECTANCE IMAGING SENSOR (IRIS) TECHNOLOGY", the contents of which are incorporated herein by reference as though fully set forth herein.

FIELD OF THE TECHNOLOGY

The subject disclosure relates generally to biomolecular analysis, and more particularly to optical technologies for label-free detection and monitoring of molecular binding kinetics.

BACKGROUND OF TECHNOLOGY

Various modalities of biosensing have been applied to detection of biological markers. These biomarkers play a critical role both in healthy physiological conditions and during the course of diseases that threaten human health, such as cancer, cardiovascular diseases, infectious diseases, neurologic diseases, and many others. Depending on the application, diagnostics can rely on detection of biomarkers related to infectious agents (such as viruses, bacteria, yeasts, etc.) and toxins, as well as markers related to host immune response and changes in the physiological conditions. In recent years, the ability to detect biomarkers in extremely low concentration target solutions has led to advances in basic and clinical research and in their predictive role regarding diagnosis, prognosis, and progression of diseases. Highly sensitive, specific, quantitative, and multiplexed detection of biomarkers will be a pivotal focus of the technological evolution of future generation diagnostics.

Label free optical biosensors are an attractive solution for biomolecular analysis of biomarkers, offering highly sensitive, multiplexed, and real-time affinity measurements. Direct monitoring of primary molecular binding interactions, without the need for secondary reactants, would markedly simplify and expand applications of high-throughput, label-free detection methods. A detailed understanding of association and disassociation kinetics of a target-ligand complex can provide valuable insight into clinical efficacy, safety, duration of action, tolerability, therapeutic differentiation, and indication of the complex. For example, pharmaceuticals with a faster off-rate yielding shorter durations of action, and those with shorter off-rates yield longer durations of action, affecting dose amounts. As such, small molecules, including organic molecules with a molecular weight of less than 1 kDa, and measurements of their affinity are of growing interest to the diagnostic and pharmaceutical industries. Amino acids, nucleotides, sugars, and many therapeutics fall into the category of small molecules, and therefore, sensitive small molecule affinity measurements are crucial to drug and diagnostic development. Label-free detection is essential for measurement of molecular binding kinetics to determine native, or unperturbed, binding affinity since labels such as fluorescent dyes affect the binding affinity.

In label-free optical sensing, a signal is dependent on the optical refractive index change caused by the presence of the molecule and scales with the size of the molecule, and therefore, low signals and high background noise can make it difficult to characterize binding of small molecular weight targets. Similarly, the ability to perform affinity measurements in a diverse range of target solutions is desirable as it allows for more diverse bio-molecular analysis; there are significant limitations on target solution composition as a result of bulk effect, a major technical challenge for all optical label-free kinetic measurements. Furthermore, use of additives may be required for solutions containing target molecules, especially for small molecular weight targets, introducing a change in refractive index.

The bulk effect is background signal arising from the difference in liquid composition, and therefore, refractive index of the analyte solution from a buffer. If the bulk effect can be eliminated, kinetic measurements could be performed in any refractive index solution, increasing the ease and flexibility of experimentation and allowing for accurate small molecule measurements.

For example, dimtheyl sulfoxide (DMSO) is often added to solutions to increase the solubility of DNA or other molecules and is a typical contributor to the bulk effect. Adding a small amount of DMSO, which has a refractive index of 1.479, results in a solution refractive index change from 1.335 for 1× Phosphate Buffered Saline (PBS) to 1.336 for a 1% solution of DMSO in 1×PBS at room temperature.

To combat the bulk effect, surface plasmon resonance (SPR) has been one of the most used label-free detection techniques due to its high sensitivity, flexibility, and widespread commercial availability. In its simplest form, transverse magnetic polarized light undergoes total internal reflection at a glass/gold film interface, which under certain resonance conditions excites surface plasmon waves. This resonant coupling results in an evanescent surface wave that extends into the solution, allowing for sensing minute changes in the local refractive index. However, changes in refractive index can be caused both due to molecular binding and to bulk changes in solution, since SPR measures the refractive index with the full penetration depth of the evanescent wave. In a simplistic view, for a penetration depth of 150 nm (the effective penetration depth of an industry leading SPR system), a 1 nm molecular adsorption is easily lost to the background signal caused by a small change in refractive index of the remaining 149 nm solution within the penetration depth.

SPR instruments correct for the bulk effect using a reference channel where a solution intended to be identical to the analyte solution is run, without containing any analyte. This referencing technique requires high precision in matching the properties of the reference solution to the analyte solution increasing the difficulty of the experiment and the possibility for error. In addition to this, SPR sensors incorporate a matrix of carboxymethylated dextran to the gold surface, which is a carbohydrate polymer that adds about 100 nm thickness and provides a 3-dimensional (multilayer) probe functionalization on the surface. This polymer fills a large amount of the penetration depth and increases the effective surface area with which the capture molecule, or ligand, can bind.

Diffusion of the target molecule through the carboxymethylated dextran layer can limit the binding kinetics, and the inhomogeneous distribution of the carboxymethylated dextran layer can introduce other effects (pH, charge distribution) that can interfere with binding. Since the bulk effect in SPR-based molecular sensors arises due to the underlying physical principles of evanescent waves, it is a fundamental limitation of the technique itself.

Interferometric Reflectance Imaging Sensors (IRIS) are not based on evanescent fields and do not suffer from this limitation. While other technologies collect signal and background together in each measurement, IRIS produces spectral reflectivity information that allows for extracting surface binding and solution refractive index as separate quantities. To detect changes in biomass, the IRIS technique uses common-path interferometry where incident light is reflected from a sensor surface, and the fields from each layer of the sensor surface interfere to produce a signal. Accumulation of biomass on the top surface changes the optical path length and therefore, the measured interference signal.

Performing this measurement across multiple wavelengths creates a spectral signature that changes uniquely with surface biomass accumulation and solution index of refraction. These two sources of reflectivity can be distinguished. For example, imaging across four different LED illumination wavelengths and fitting to a reflectance curve using a look-up-table can enable one to convert intensity into biomass. Single-color illumination images can be captured for the duration of the experiment, and the measurements converted to biomass using the generated look-up-table. While this method offers very significant improvements in speed and computational costs, the drawback for these single-wavelength measurements is that the bulk effect cannot be completely separated from surface binding.

SUMMARY OF THE TECHNOLOGY

An example label-free method detects changes in biomass accumulating on a surface includes providing a sensor substrate. The method includes providing a first illumination source and a second illumination source. The first illumination source generates a first light having a first central wavelength and the second illumination source generates a second light having a second central wavelength. The second central wavelength is different than the first central wavelength. The method includes mixing the first light with the second light to produce a combined light. The method includes providing an analyte solution on the sensor substrate. The method includes reflecting incident light of the combined light from the sensor substrate to produce a signal. The method includes recording the signal with a camera to obtain a reflectance image. The method includes computing a biomass accumulated on the substrate. The biomass accumulated on the substrate is based on the reflectance image. The example method may include one or more of the following steps, either alone or in combination.

Prior to mixing the first light with the second light, the method may include determining a bulk effect minimization wavelength based on a thickness and a composition of the sensor substrate and a refractive index of the analyte solution. The analyte solution may be DMSO or PBS. The first light and the second light may be mixed such that the combined light has a weighted spectrum corresponding to the bulk effect minimization wavelength. The first central wavelength may be longer than the bulk effect minimization wavelength, and the second central wavelength may be shorter than the bulk effect minimization wavelength. An intensity of the first illumination source and an intensity of the second illumination source may be adjusted to produce the combined light such that a weighted spectrum of the combined light coincides with the bulk effect minimization wavelength. Mixing the first light and the second light may occur within an integrating sphere. The camera may be a monochromatic camera.

The sensor substrate may include two or more dielectric layers such that imaging system is configured for common path interferometry. The dielectric layers may include a $SiO_2$ layer on a silicon chip. The method may include immobilizing ligands at a spotting concentration on the sensor substrate. The method may include flow the analyte solution over the sensor substrate.

The first illumination source and second illumination source may be different color LEDs. The first light and the second light may each have a central wavelength corresponding to one of the following standard LEDs: a blue LED having a central wavelength of 456 nm; a green LED having a central wavelength of 518 nm; a yellow LED having a central wavelength of 598 nm; or a red LED having a central wavelength 635 nm.

An example interferometric sensing apparatus to detect changes in biomass includes a first illumination source configured to generate a first light having a first central wavelength. The sensing apparatus includes a second illumination source configured to generate a second light having a second central wavelength. The sensing apparatus includes an integrating sphere. The integrating sphere is configured to mix the first light from the first illumination source and the second light from the second illumination source to produce a combined light. The sensing apparatus includes a sensor substrate. The sensing apparatus directs the combined light toward the sensor substrate to produce a signal. The sensing apparatus includes a camera configured to image the signal to obtain a reflectance image. The example sensing apparatus may include one or more of the following steps, either alone or in combination.

The integrating sphere may be further configured to mix the first light from the first illumination source and the second light from the second illumination source based on a bulk effect minimization wavelength of the sensor substrate. The integrating sphere may include a first port for the first illumination source and a second port for the second illumination source. The first port for the first illumination source may be located on a different side of the integrating sphere from the second port for the second illumination source. The integrating sphere may include a port containing both the first illumination source and the second illumination source.

The first central wavelength may be longer than the bulk effect minimization wavelength, and the second central wavelength may be shorter than the bulk effect minimization wavelength. An intensity of the first illumination source and an intensity of the second illumination source may be adjusted to produce the combined light such that the combined light has a weighted spectrum corresponding to the bulk effect minimization wavelength. The first light and the second light may each have a central wavelength corresponding to one of the following standard LEDs: a blue LED having a central wavelength of 456 nm; a green LED having a central wavelength of 518 nm; a yellow LED having a central wavelength of 598 nm; or a red LED having a central wavelength 635 nm. The first illumination source and second illumination source may be different color LEDs. The first illumination source and second illumination source may be different color LEDs on a single multi-color LED package.

The sensor substrate may include two or more dielectric layers such that the sensing apparatus is configured for common path interferometry. The dielectric layers may include a $SiO_2$ layer on a silicon chip.

The camera may be a monochromatic camera. The apparatus may be configured to determine a molecular binding affinity based on the reflectance image. As a result, the sensor substrate may include capture molecules including one or more of the following: proteins, peptides, nucleic acids, other biological molecules. The sensor substrate may include analytes within the analyte solution including one or more of the following: proteins, peptides, nucleic acids, macromolecules, vesicles, enzymes, hormones, or drug molecules.

Any two or more of the features described in this specification, including in this summary section, may be combined to form implementations not specifically described in this specification.

The details of one or more implementations are set forth in the accompanying drawings and the following description. Other features and advantages will be apparent from the description and drawings, and from the claims.

BRIEF DESCRIPTION OF THE DRAWINGS

So that those having ordinary skill in the art to which the disclosed system pertains will more readily understand how to make and use the same, reference may be had to the following drawings.

FIG. 4a is a graph of change in reflectance of an IRIS substrate due to biomass accumulation.

FIG. 4b is a graph of change in reflectance of an IRIS substrate due to a change in index of refraction of a solution.

FIG. 5a is a graph of change in reflectance of an IRIS substrate due to changes in index of refraction.

FIG. 5b is a graph of change in reflectance of an IRIS substrate due to changes in index of refraction when illuminated by LEDs of two different colors.

FIG. 7a represents an experiment where the bulk effect was not minimized, while FIG. 7b represents an experiment where the bulk effect was minimized in accordance with the subject technology.

DETAILED DESCRIPTION

Figure 1:
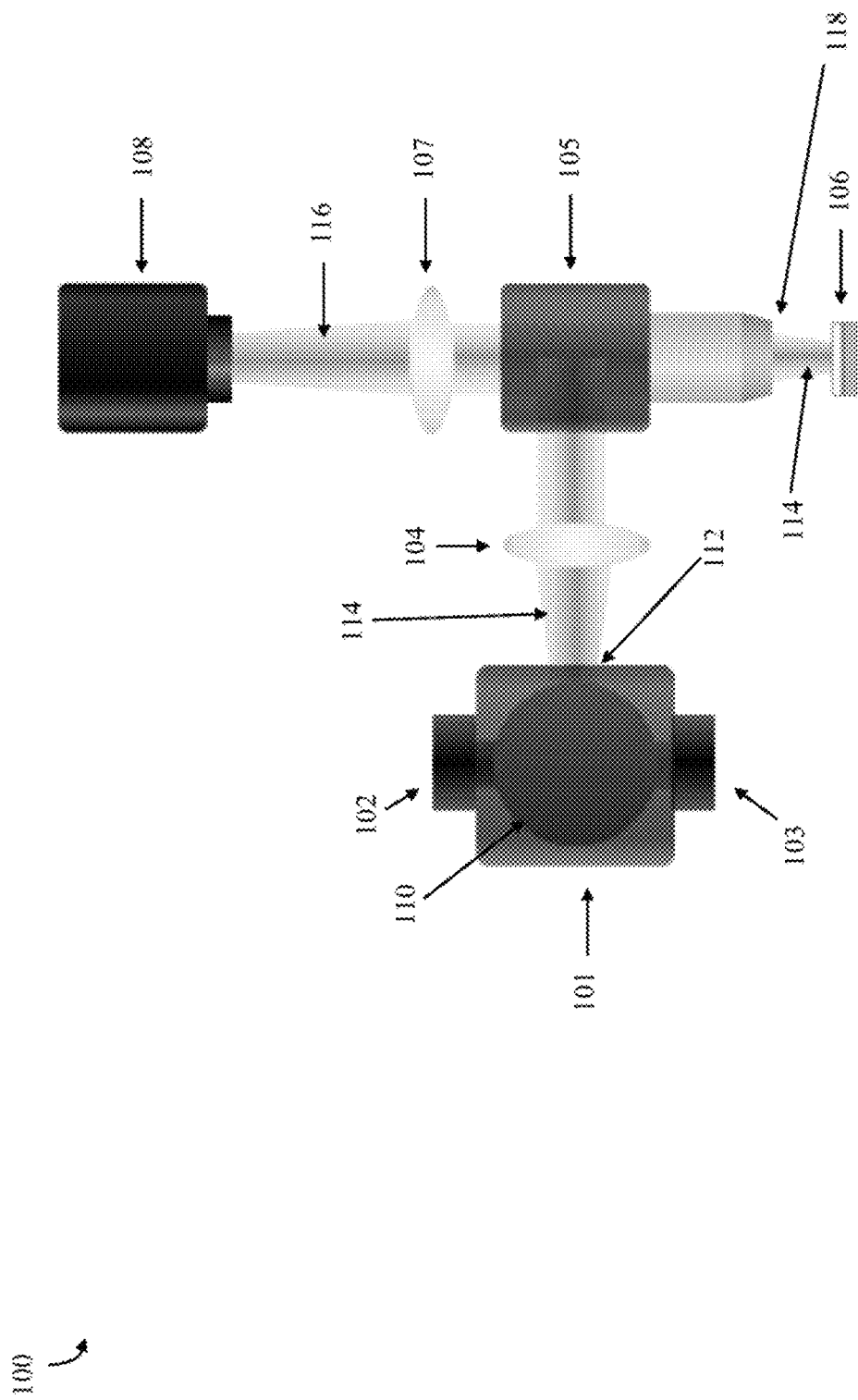
FIG. 1 is an overhead view of an IRIS apparatus for use as part of a label-free, bulk effect-free method of detecting changes in biomass in accordance with the subject technology.

Described herein are example implementations interferometric reflectance imaging sensor (IRIS) systems and methods providing bulk effect minimization for binding kinetic measurements, enabling small molecule affinity characterization. In this regard, an IRIS system uses the interference of light for quantitative, label-free and dynamic detection including ensemble biomolecular mass measurements. IRIS is based upon the interference of the fields reflected off a layered substrate. Transduction is based on spectral reflectivity in this regard. As the overall thickness of a layer of a substrate is increased due to biomass accumulation on the surface of the substrate, an optical path increases, which in turn results in quantifiable shifts in spectral reflectivity. For each thickness of substrate, there exists a wavelength where index of refraction changes in solution have no effect on the observed reflectance, referred to as the bulk effect minimization (or bulk effect free) wavelength. Example implementations herein illuminate with two different wavelength sources having intensities that can be altered to allow for bulk effect compensation.

The subject technology overcomes many drawbacks associated with systems for monitoring molecular binding kinetics. In brief summary, the subject technology relates to an IRIS apparatus, and method of operating the same, that integrates a first and second illumination source of different wavelengths to produce a combined light for imaging a substrate and biomass, while minimizing the bulk effect. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", "latitudinal", "longitudinal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Referring now to FIG. 1, an example bulk effect minimization IRIS apparatus 100 is shown. The bulk effect minimization IRIS apparatus includes an integrating sphere 101. The integrating sphere 101 is an optical component consisting of a substantially spherical cavity covered with a diffuse reflective coating. The integrating sphere 101 receives light from a first and a second illumination source 102, 103 into the substantially spherical cavity 110 of the integrating sphere 101. Notably, in some embodiments, more than two illumination sources may introduce light into the integrating sphere 101. The first and second illumination source 102, 103 can each be a color LED producing light having a certain central wavelength (notably, for ease of explanation, the central wavelength produced by a given source is referred to as the wavelength of that source herein).

In some implementations, the inner surface of an integrated sphere may include a highly reflective, thus low loss, and highly scattering, preferably Lambertian reflector, coating. Light rays incident on any point on an inner surface of the integrating sphere 101 cavity are, scattered in all directions and after multiple scattering reflections, light is distributed equally to all other points regardless of the original entry point. The integrating sphere 101 therefore combines all input light with an apparent intensity uniform over all positions within an exit window 112, described in further detailed below, of the integrating sphere 101. Thus, spatial information for each color is lost and does not affect the reflectivity image on a camera downstream. The intensity of the illumination sources 102, 103 can be adjusted to affect the properties of the combined light within the integrating sphere 101. The illumination sources 102, 103 may be located in ports opposite one another along the circumference of the integrating sphere 101. In other cases, the illumination sources 102, 103 may also be located within the same input port, or at another location along the exterior of the integrating sphere 101. In this regard, illumination sources 102, 103 may include different color LEDs on a single multi-color LED package or chip such that a single multi-color LED package illuminates using two or more different colors. For that matter, an LED chip may consist of multiple color dies. In some implementations, integrating sphere 101 may receive light from one, two, three, or four illumination sources, the illumination sources orthogonal to an exit window 112 or aperture. In this regard, integrating sphere 101 may be enclosed within a cube with 4 faces orthogonal exit window 112 or aperture.

The integrating sphere 101 includes an exit window 112 running orthogonal to the illumination sources 102, 103 through which the combined light 114 exits. The illumination sources may be orthogonal exit window 112 to avoid light from an illumination source coupling to exit window 112. In this configuration, the goal is to eliminate a direct path from the illumination sources 102, 103 to the exit window 112 and requiring one or more scattering reflections before light can reach the exit window 112. A lens 104 collimates and transmits the combined light 114 toward a beam splitter 105. As such, the combined light 114 is then provided to the beam splitter 105 which directs the combined light 114 to a sensor substrate 106, described in further detail below. Notably, the lens 104 and beam splitter 105 are exemplary components which are used in the exemplary apparatus 100 to direct light as described herein. It should be understood that other optical components could be used in lieu of the lens 104 and beam splitter 105.

The combined light is then directed to illuminate the sensor substrate 106 which can include a biomass as described in more detail below. The combined light reflects off the sensor substrate 106, producing a signal 116 which is directed through objective lens 118, the beam splitter 105, and a tube lens 107 for receipt by a camera 108 imaging the substrate 106. The camera 108 is a monochromatic camera, such as a CMOS camera, and detects only the intensity of light. Therefore, the camera 108 is not impacted by changes in hue of the combined light or substrate background, and is configured to measure the total intensity of light.

The intensity (I(d)) measured by camera 108 is dependent on a wavelength-dependent reflectance(R (d, λ)), multiplied by the incident illumination source intensity which is an electric field amplitude of the ($|E_{led}|$) squared. The result is then multiplied by the camera 108 quantum efficiency (QE (λ)) and integrated over the spectral bandwidth of the camera 108:

$$I(d) = \int_{\lambda=350\ nm}^{\lambda=750\ nm} [R(d,\lambda)|E_{led}|^2 QE(\lambda)] d\lambda \qquad \text{Eqn. 1}$$

The camera 108 can be a low read noise, low dark current noise camera, limited by signal dependent shot noise. The noise is minimized through temporal and spatial image averaging. Averaging multiple spots of the microarray decreases the throughput, requiring multiple spots of the same ligand, or larger spots, in order to have sufficient pixels for averaging. This decreases the number of distinct biomolecules that can be spotted and tested simultaneously. While averaging spatially decreases the usable sensor substrate 106 area, averaging temporally decreases the temporal resolution. Therefore, temporal averaging decreases the timescale on which a binding event can be measured. To increase the temporal resolution while still leveraging averaging for low noise operation, software may interface with the camera 108 and the illumination sources 102, 103 to efficiently perform image capture and averaging.

In terms of the effect of temporal and spatial averaging on noise levels, for a single microarray spot with a pixel area of 3852 (240 µm diameter spot) captured with blue LED illumination, noise level calculated as the standard deviation of the signal over the mean signal, from a single captured frame is around 6%. This value decreases to 0.65% after 20 frames and further to 0.6% after 100 frames. After averaging twice as many frames for a total of 200 frames, the additional noise reduction is only 0.01% for a value of 0.59%. 100 frame averaging is generally suitable for IRIS experimentation. This allows significant noise reduction, while generating a frame every 6 seconds.

Similarly, the benefit of spatial averaging was examined of up to 18 spots of 1 Biotin bound to streptavidin, calculated as the standard deviation of the signal over the mean signal, for a 7 minute time period with blue LED illumination. The images have been temporally averaged for a duration of 100 frames, and where each spot contained 3852 pixels, and therefor averaging 18 spots utilized 69,336 pixels of the camera's 5 MP (about 1% of the pixel area). Averaging 10 spots lowers the noise to 0.22%, and further, averaging 18 spots lowers the noise to 0.1%.

The number of spots needed to average to detect binding varies with molecule. Biotin is a small (244 Da) molecule that binds with high-affinity to streptavidin. Due to its small size, it can be difficult to detect in label-free measurements. By averaging 18 streptavidin spots, using 100 frame temporal averaging, data exhibits 0.1% noise, and the binding event has a signal to noise ratio of 5 from the baseline signal (before the biotin was introduced). Based on this data the limit of detection is 0.2% change in reflectivity. Averaging more spots has the potential to decrease this limit of detection, with the consequence of limited the high-throughput nature of the IRIS apparatus 100.

Figure 2:
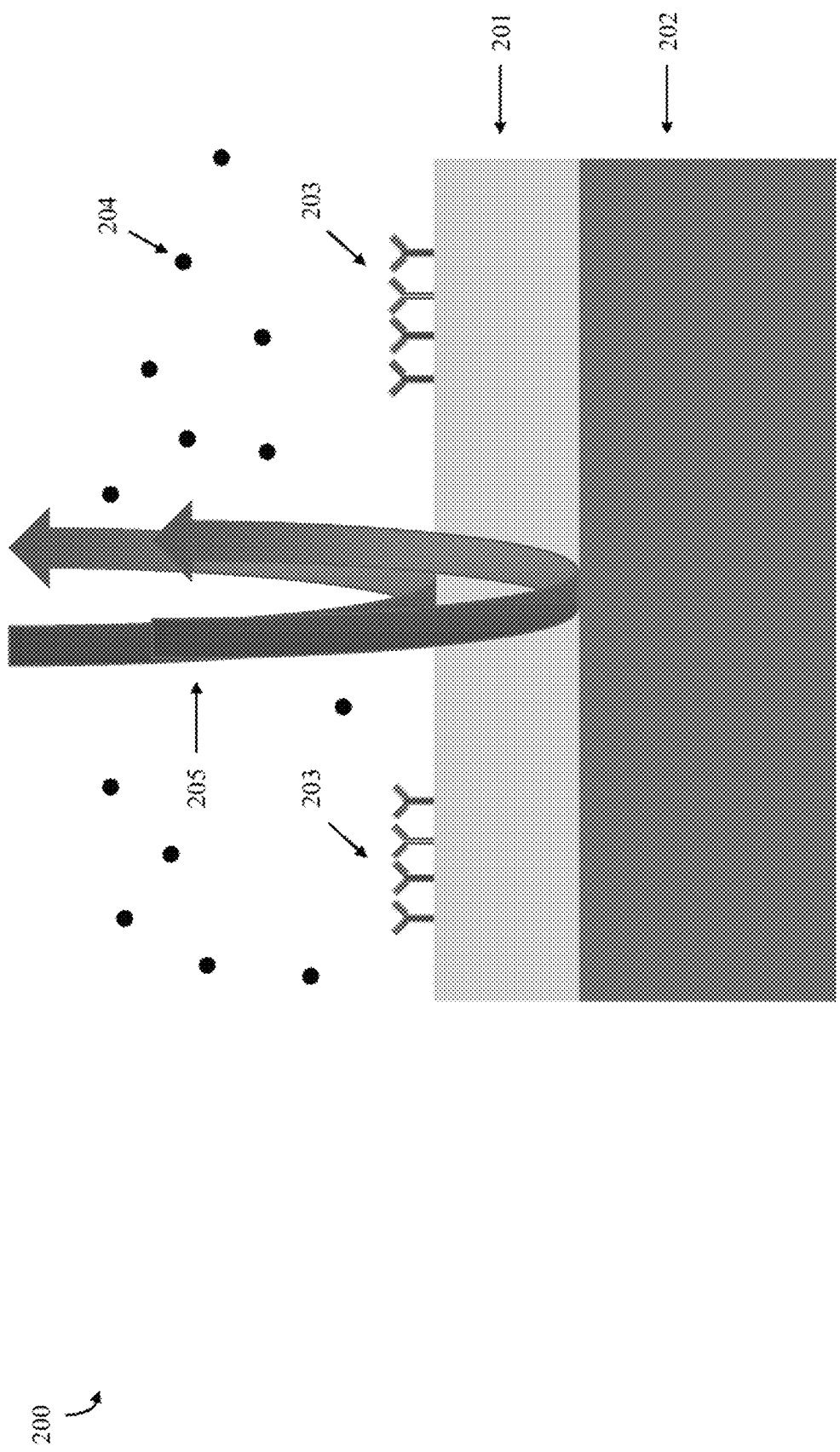
FIG. 2 is a side view of an IRIS substrate, including capture molecules and light reflecting therefrom, for use as part of the IRIS apparatus of FIG. 1.

Referring now to FIG. 2, a side view of an example IRIS substrate 200, also referred to herein as a sensor substrate, is shown. The IRIS substrate 200 can be used as part of an IRIS apparatus 100 as described above, similar to the substrate 106. The substrate 200 includes a first substrate layer 201 and a second substrate layer 202. In particular, the first substrate layer 201 is a thermally grown, partially reflective $SiO_2$ layer positioned atop the second substrate layer 202, the second substrate layer being a highly reflective silicon wafer. The dual layered $SiO_2$/Si chip used here has a much higher response to changes in biomass than to changes in the composition of an analyte solution, described below. By using a first substrate layer 201 and second substrate layer 202, the subject technology embodies a common path interferometer from reflections at each interface of each substrate layer 201, 202.

Layers 201, 202 may be dielectric. In such an implementation, layers 201, 202 may include an electrical insulator that can be polarized by an applied electric field. Additionally, layers 201, 202 may include properties of transmitting electrical force without conduction, such that they are insulating. Layers 201, 202 may include no loosely bound, or free, electrons drifting through the material comprising them. Layers 201, 202 may be efficient supporters of electrostatic fields.

The first substrate layer 201 includes capture molecules 203, or ligands, which can bind to biomass, as discussed in more detail below. Light 205 from a light source (e.g. combined light from an integrating sphere) is reflected from IRIS substrate 200, allowing a camera of the corresponding IRIS apparatus to image the IRIS substrate 200. Notably, these layers 201, 202 are exemplary of one arrangement of an IRIS substrate 200, and it should be appreciated by one of ordinary skill in the art that an IRIS apparatus in accordance with the subject technology may use layers of different materials, and/or in different arrangements.

An analyte solution 204 may be introduced to the sensor substrate 200. The analyte solution 204 contains molecules which may bind to the capture molecules 203, or ligands, on the sensor substrate 200 for measuring the binding affinity in accordance with the subject technology. For example, for kinetic binding measurements, a $SiO_2$ first substrate layer 201 is coated with a polymeric glass coating MCP-4 (copoly DMA-NAS-MAS) for covalent biomolecule immobilization, and the ligands 203 are deposited, allowing them to immobilize on the surface. The analyte solution 204 is then flowed over the substrate 200 and captured by the ligands 203, resulting in an increase in thickness.

Incident light 205 of a combined light source is reflected from the first substrate layer 201 (a thin film layer on the sensor substrate 200) to produce a signal, measured as a change in intensity by a camera 108 such as a CCD or CMOS sensor. The reflectance spectrum R of the substrate 200 can be calculated from the Fresnel equations is as follows:

$$R = \frac{r_{12}^2 + r_{23}^2 + 2r_{12}r_{23}\cos(2\Phi)}{1 + r_{12}^2 r_{23}^2 + 2r_{12}r_{23}\cos(2\Phi)},$$  Eqn. 2

$$\text{where } r_{12} = \frac{n_1 - n_2}{n_2 + n_1},$$  Eqn. 3

$$r_{23} = \frac{n_2 - n_3}{n_3 + n_2},$$  Eqn. 4

$$\Phi = \frac{2\pi n_2 d}{\lambda},$$  Eqn. 5 where $r_{12}$ represents an interface reflection coefficient for the solution 204 and first substrate layer 201, such as a media-$SiO_2$ interface, and $r_{23}$ represents the interface reflection coefficient between the first substrate layer 201 and the second substrate layer 202, such as a $SiO_2$—Si interface. $n_1$, $n_2$, $n_3$ are the wavelength-dependent refractive index of the solution media, first substrate layer 201, and second substrate layer 202 respectively. d is the thickness of the first substrate layer 201. For each thickness of the first substrate layer 201 of a given material, there exists a wavelength of light 205 where index of refraction changes in an analyte solution 204 flowed over the first substrate layer 201 have no effect on the observed reflectance, referred to herein as the bulk effect minimization wavelength. Thus, biomass accumulated on the substrate 200 can be computed based on the reflectance of the sensor substrate 200 without interference from index of refraction changes caused by the analyte solution 204, provided the light 205 has the bulk effect minimization wavelength.

Figure 3:
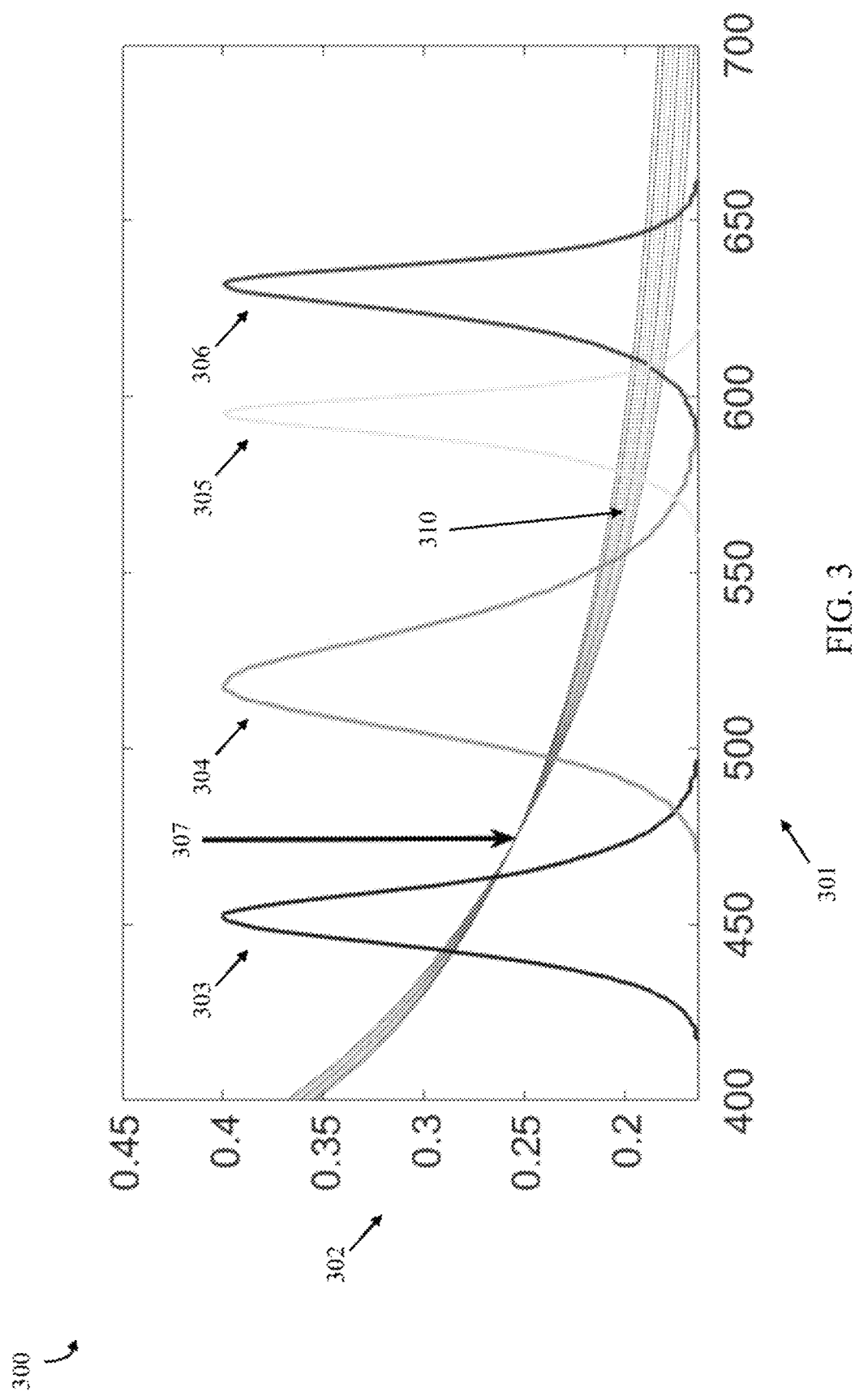
FIG. 3 is a graph of illumination wavelength vs. reflectance for various color LEDs on an IRIS substrate for an IRIS apparatus in accordance with the subject technology.

Referring now to FIG. 3, a graph 300 of the reflectance of an IRIS substrate at various illumination wavelengths is shown. The x-axis represents illumination 301, the y-axis represents reflectance 302, and graph line 310 represents the reflectance generated from an illumination source of an IRIS apparatus (i.e. as described with respect to IRIS apparatus 100) from the IRIS substrate. The IRIS substrate has an oxide layer (e.g. first layer 201) thickness of 119 nm. Various analyte solutions with indices of refraction ranging from 1.333 to 1.433 were simulated to be exposed to the oxide layer to generate the graph 300. The graph lines 303, 304, 305, and 306, represent the wavelengths of individual LEDs which can be included within the IRIS apparatus 100. In particular, graph line 303 represents a blue LED, graph line 304 represents a green LED, graph line 305 represents a yellow LED, and graph line 306 represents a red LED. Thus, the IRIS apparatus 100 pictured in FIG. 1 may incorporate four independent LEDs with central wavelengths including 456 nm (blue), 518 nm (green), 598 nm (yellow), and 635 nm (red) for illumination of the sensor substrate. Acquisition for affinity measurements is generally done using blue LED illumination as the sensor substrate 106 exhibits maximum sensitivity to binding with this illumination at the oxide thickness generally used (110 nm). It should also be appreciated by one skilled in the art that a range of different central wavelengths outside of 456 nm, 518 nm, 598 nm, and 635 nm may be used in order to compensate for the intensity at any other given wavelength.

The reflectance of each LED decreases with increased analyte solution index refraction from a nominal refractive index of 1.333. Two or more of the LEDs can be combined in different to ratios to create a weighted spectrum which can coincide with a bulk effect minimization wavelength. For example, the integrating sphere 101 of the IRIS apparatus 100 can be used to generate a combined light 114, from light from separate sources 102, 103, for illuminating the substrate 106. The combination of separate LEDs allows for the full range of illumination wavelength measurements represented by graph line 310. By plotting reflectance of the substrate (graph line 310), the bulk effect minimization wavelength of illumination for the IRIS substrate can be seen at point 307. This represents a bulk minimization wavelength of 473 nm. Therefore, in order to minimize the bulk effect of the exemplary analyte solution and sensor substrate with a first oxide layer of 119 nm thickness, the IRIS apparatus must illuminate the substrate with a light having a 473 nm wavelength.

The intensity of the LEDs, or another provided illumination source incorporated on the IRIS apparatus 100, can be altered and controlled to reach the desired wavelength of the bulk effect minimization region 307 to compensate for the bulk effect. The green and blue LEDs can be combined in a prescribed amount using the integrating sphere 101 of the IRIS apparatus 100 to create the desired spectral profile while maintaining color-independent illumination uniformity, for producing bulk effect minimization results. By mixing the two or more colors at a prescribed weight ratio, the direct reflectivity measurement on a monochrome sensor, such as a CMOS camera, yields bulk effect minimization. Therefore, since the substrate illuminated in graph 300 has a bulk free region when illuminated with a wavelength of 473 nm, blue and green LEDs can be combined in a ratio to provide the desired illumination wavelength spectrum of 473 nm. It should be appreciated by one skilled in the art that the subject IRIS apparatus 100 is not limited to having LED lights of the colors shown herein, or to LED illumination sources in particular. For example, the IRIS apparatus 100 could combine a red and yellow LED for an analyte solution with a lower index of refraction, such that an increase in intensity due to the bulk effect at the yellow 598 nm wavelength can be compensated for by a decrease in intensity due to the bulk effect at the red 635 nm wavelength.

Since there is no phase relationship between the individual LEDs, the intensity measured by the camera 108 when illuminating with two LEDs is the sum of the contributions from each. The resulting equation for I(d) follows, where A and B are values for adjusting the contribution from each LED:

$$I(d) = \int_{\lambda=350\,nm}^{\lambda=750\,nm} A[R(d,\lambda)|E_{led}|^2 QE(\lambda)d\lambda + \int_{\lambda=350\,nm}^{\lambda=750\,nm} B[R(d,\lambda)|E_{led}|^2 QE(\lambda)d\lambda$$  Eqn. 6

The bulk effect minimization region 307, can be experimentally determined through use of two solutions of differing refractive indices, for example PBS and 10% DMSO in PBS flowed consecutively. First a solution of refractive index A is flowed over the sensor substrate 106, 200, and images are captured at decreasing percentages of blue LED and correspondingly increasing percentages of green LED. Then a solution of refractive index B is flowed, and images are captured at the same blue and green percentages. From this information, the optimal illuminated is obtained where the difference in intensity values is minimized between the two solutions.

Referring now to FIGS. 4a-b, graph 401 shows the change in reflectance of a substrate due to biomass accumulation and graph 402 shows the change in reflectance due to a change in index of refraction. In graph 401, graph line 404 represents the change in reflectance of a substrate illuminated by a blue LED with a biomass accumulation of 0.1 nm (t), while graph line 406 represents the change for a green LED, graph line 408 represents the change for a yellow LED, and graph line 410 represents the change for a red LED. In graph 402, graph line 418 represents change in reflectance of a substrate due to a 0.01 refractive index change of the solution for a blue LED, while graph line 416 represents a green LED, graph line 414 represents a yellow LED, and graph line 412 represents a red LED.

Here, the wavelength-dependent first substrate layer 201, a thin film with a thickness between 113 and 130 nm, exhibited an increase in reflectance with biomass accumulation over all LED sources 404, 406, 408, 410; however, an increase in solution index from a nominal refractive index of 1.333 results in a decrease in intensity for blue LED illumination (455 nm) and an increase in intensity for green LED illumination (518 nm) in this thickness range. By illuminating with two different wavelength sources, an increase in intensity due to the bulk effect at one wavelength can be compensated for by a decrease in intensity due to the bulk effect at another.

In the exemplary embodiment, values for the intensity ratio of a blue and green LED contribution (A and B in Eqn. 6), minimized the bulk effect at various substrate thicknesses, minimization of the bulk effect occurring at value zero on the x-axis. As shown in the graph 402, bulk effect minimization was found to occur at intensity ratios of blue (456 nm) to green (518 nm) of 1:0 for a 113 nm substrate thickness (graph point 420), 0:88:0.12 for 115 nm, 0.76:0.24 for 117 nm, 0.63:0.37 for 119 nm, further illustrated in FIGS. 5a and 5b.

Undesirable changes in signal were limited to <0.0003% of the signal for refraction indices from 1.33-1.34. A 0.0003% signal change corresponds to 0.8 pg/mm², which is below the noise floor of the IRIS apparatus 100 and would therefore be undetectable. A bulk effect minimization wavelength exists for substrate thicknesses from 113 nm to 130 nm, marked by longitudinal lines 422 in the example graph 402.

While the bulk effect is naturally low in IRIS measurements around the optimal substrate, or oxide, thickness, where the bulk effect approaches zero, the bulk effect increase upon deviation from the optimal thickness and further is increased when operating in solutions with a larger difference in refractive index. Substrate films may have a tolerance of ±5 nm which can result in a change in reflectivity due to the bulk effect of 4% in a 1.43 reflective index solution. For a single microarray spot with blue LED acquisition, a measured change in reflectivity over reflectance was around 1%, and therefore, the bulk effect was limiting as detection moves to smaller and smaller molecules.

FIGS. 5a and 5b show graphs 501a, 501b illustrating response due to changes in index of refraction, based on sensor substrate thicknesses ranging from 113 nm to 119 nm. FIG. 5a shows the reflectance for various substrate thicknesses over a range of analyte solution refractive indices from 1.33 to 1.45. In particular, the graph 502a shows graph lines representing the following oxide layer thickness: graph line 504 represents a thickness of 113 nm; graph line 506 represents a thickness of 115 nm; graph line 508 represents a thickness of 117 nm; and graph line 510 represents a thickness of 119 nm. FIG. 5b shows the reflectance for the same oxide thicknesses over a range of analyte solution indices from 1.33 to 1.45 when illumination contributions were modified to minimize the bulk effect at each thickness with the following blue to green ratios: for a 113 nm substrate thickness for a blue to green LED ratio of 1:0; for 115 nm, 0.88:0.12; for 117 nm, 0.76:0.24; and for 119 nm, 0.63:0.37.

The reflectivity response of the blue and green LEDs to increasing solution refractive index was verified experimentally. Phosphate-buffered saline (PBS) solution with a refractive index of 1.335 was flowed for 5 minutes, followed by 5 minutes of 20% dimethyl sulfoxide (DMSO) in PBS (refractive index of 1.363), and 5 minutes of PBS. The change in reflectance followed the expected trend.

Figure 6A:
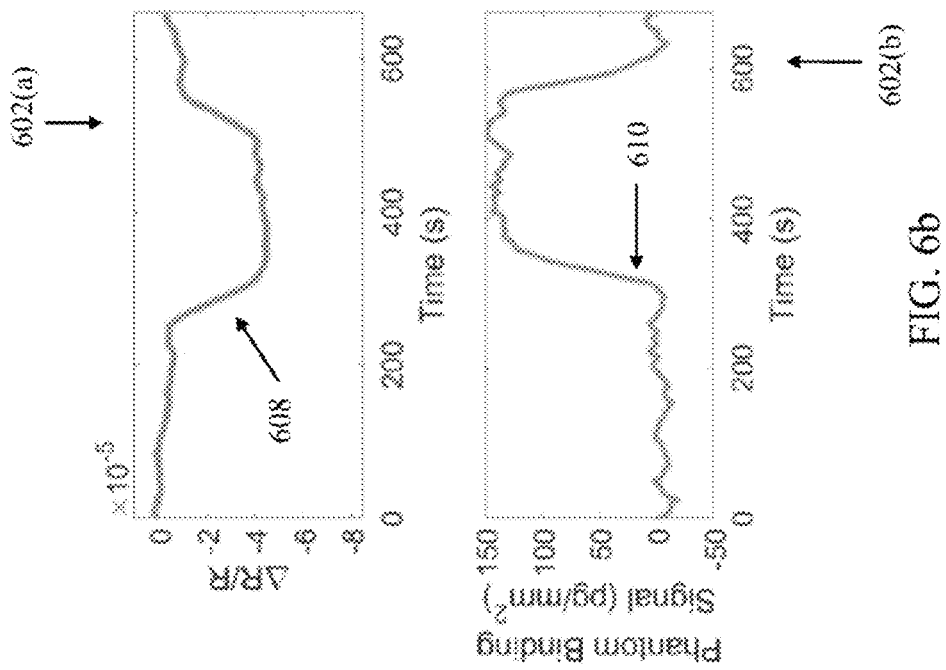
FIG. 6a is a graph of signal generated from a change in refractive index when illuminating with a blue LED.
Figure 6B:
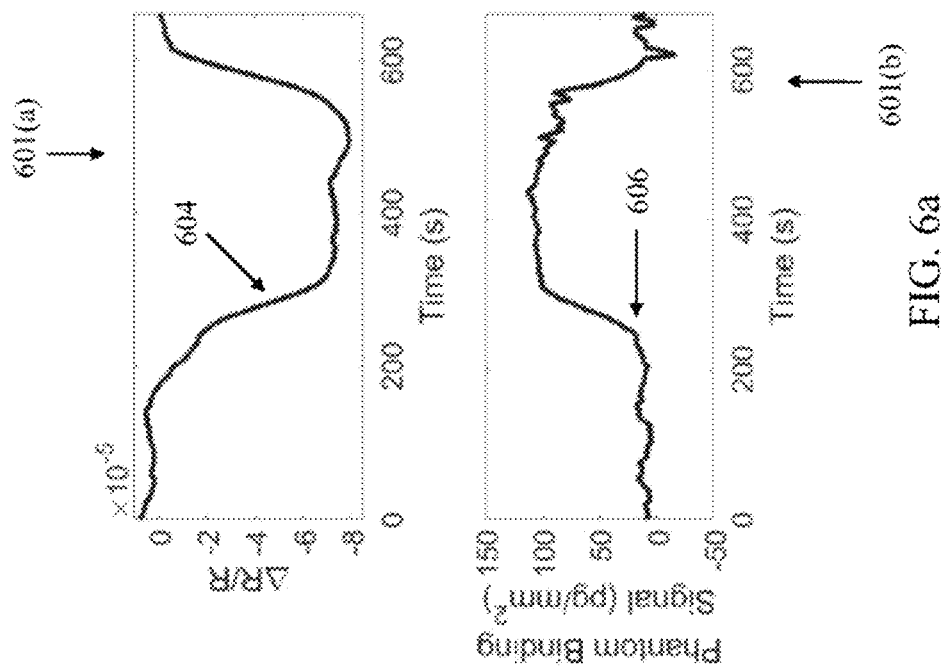
FIG. 6b is a graph of signal generated from a change in refractive index when illuminating with a green LED.

FIGS. 6a-6b show graphs 601(a), 601(b), 602(a), 602(b) illustrating reflectance signal and biomass density corresponding to reflectance signal levels. Streptavidin molecules were deposited at a spotting concentration of 18 µM on a sensor substrate. Bovine Serum Albumin (BSA) was spotted as a negative control at a spotting concentration of 15 µM. 420 nm LED was used to illuminate the sensor substrate while 1×PBS (refractive index=1.335) is flowed over the surface for 5 minutes, followed by 1% DMSO in 1×PBS (refractive index=1.336) for 5 minutes, and followed again by 1×PBS for 5 minutes. The same was then repeated with a 530 nm LED. The reflectance signal 604, 608 was measured as illustrated in graphs 601(a) and 602(a) for the separate wavelength LEDs. Graph 601(b) shows a biomass density 606 accumulated on a sensor substrate, corresponding to the reflectance signal 604 measured in the experiment with a blue LED. Similarly, graph 602(b) shows a biomass density 610 accumulated on a sensor substrate, corresponding to the reflectance signal 608.

The conversion of signal to biomass was performed by capturing images across four LED wavelengths (here 420 nm, 530 nm, 595 nm, 632 nm) and the obtained reflectance spectrum was then used to determine the film thickness 201 and subsequently the biomass. As a negative control experiment, a "phantom" binding signal was created correlating to the biomass accumulation. The phantom binding signal was created from a change in index of refraction of the analyte solution. The illusion of binding when none is present can impede the quantitative ability of IRIS.

Figure 7B:
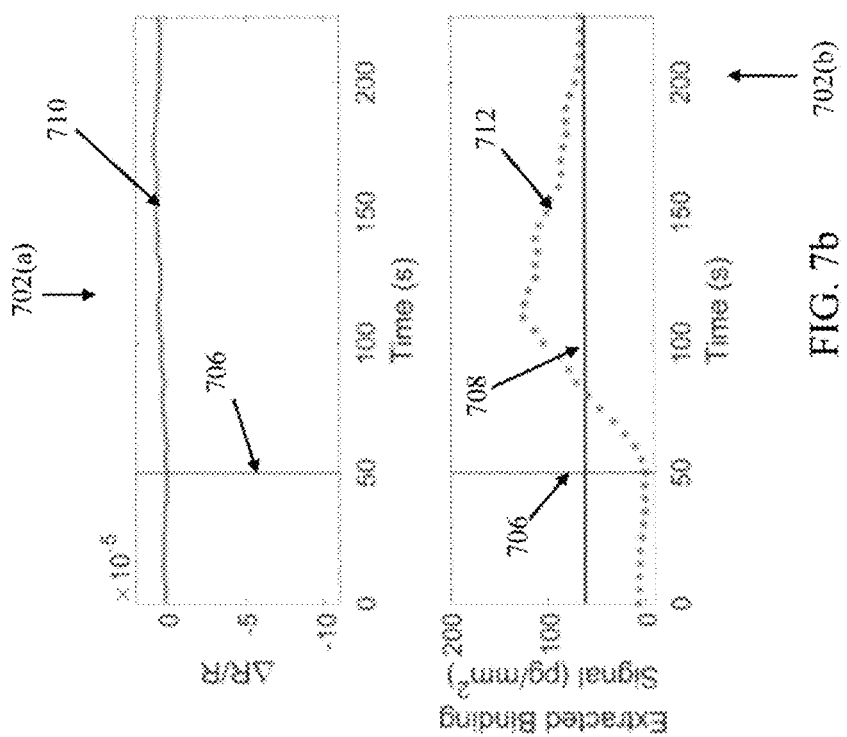
FIGS. 7a-b show graphs illustrating a binding experiment of biotin binding to immobilized streptavidin.
Figure 7A:
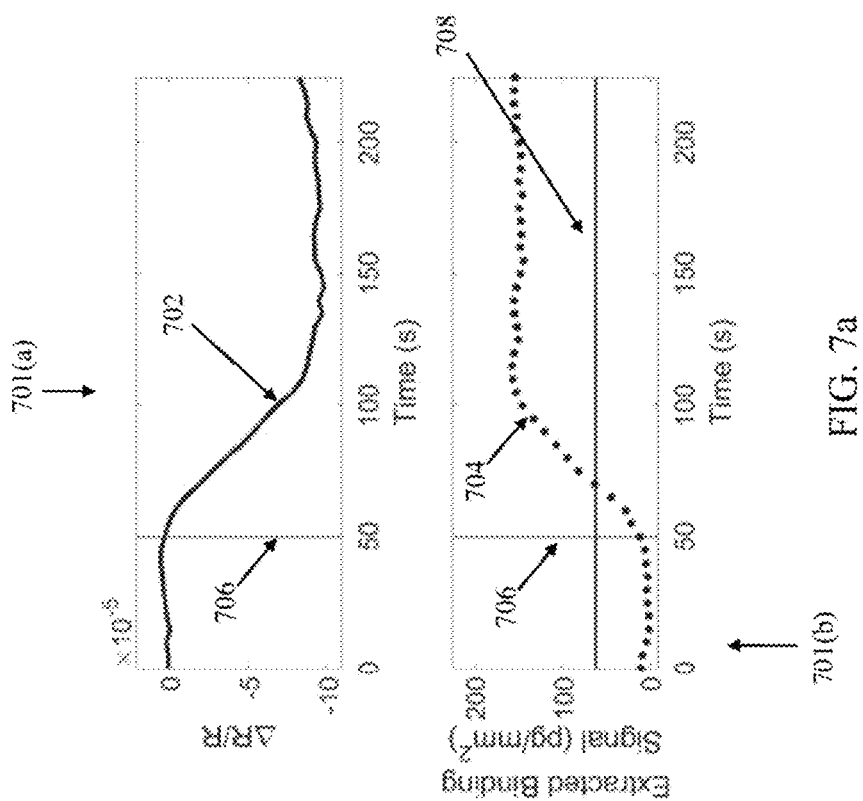

Referring now to FIGS. 7(a)-(b), graphs 701(a), 701(b), 702(a), 702(b), illustrate another binding experiment of biotin binding to immobilized streptavidin with and without the use of the bulk effect elimination. The bulk-effect minimization method described herein was performed to measure the biotin-streptavidin binding interaction. The biotin-streptavidin interaction is one of the strongest natural non-covalent interactions. Additionally, biotin is a small molecular with a molecular weight of only 244.3 Da, and thus representative of small molecule sensitivity.

The graphs 701(a), 701(b) depict the biotin-streptavidin binding experiment performed under a single color, 420 nm illumination. Biotin was be flowed across the streptavidin spots at a 1 μM concentration for 10 minutes, at a flow rate of 200 μL/min, resulting in the signal shown by graph line 702. In particular, graph line 702 shows the differential signal of the control spot (the average pixel value of the spot area minus the average value of the pixels surrounding the spot) while graph line 704 shows the extracted binding signal from graph line 702. A decrease in intensity of graph line 702 is apparent when an analyte solution is introduced, introduction of the analyte solution marked by the longitudinal line 706, resulting in an inaccurately high binding signal 704. By contrast, the graph line 708 corresponds to the binding signal obtained using an IRIS apparatus and bulk minimization technique in accordance with the subject technology. The refractive index difference between the analyte and buffer solution may create a bulk effect signal roughly 2 times the size of the biotin binding signal measured by the IRIS apparatus. The same refractive index difference in SPR would result in a bulk effect signal that is 30 times as large as the same biotin binding signal measured with IRIS. With IRIS, binding is still observable with the bulk effect present, but it hinders the quantitative nature of the technology.

The same experiment was repeated with bulk minimization illumination in accordance with the subject technology. The power of the LEDs of the IRIS apparatus was adjusted using adjustable LED drivers based on the determined bulk effect signal. This was confirmed with another run of 1×PBS, 1% DMSO in 1×PBS, and 1×PBS. A signal using the bulk effect minimization method is shown in graphs 702(a) and 702(b), represented by graph lines 710, 712, showing a binding step as expected of biotin. In particular, graph line 710 shows the reflectance signal of the negative control spot minis the background around the spot, normalized by the mean reflectance. Graph line 704 shows the extracted binding signal while graph line 712 shows the binding signal when illuminated at the bulk effect-free point. The binding curve 712 shows an initial increase after introduction of the analyte solution at line 706 before settling closer to the expected biomass value, which is a consequence of laminar flow in the fluidic chamber of the IRIS apparatus. In laminar flow, the molecules at the surface are not immediately displaced resulting in an initial artificially high signal.

The differential reflectance signal 710 of the control spot, normalized to zero shows no observable signal change due to bulk effect, confirming bulk effect minimization. The differential control spot signal 710 has a maximum reflectance change of 0.00607%, improved from 0.0225% when no bulk effect elimination method is utilized (e.g. compare graphs 701(a) and 701(b)). The biotin binding signal 704 measured under blue (420 nm) illumination with the included bulk effect in graph 701(b) is about equal to the sum of the signal resulting from the bulk solution under blue illumination with no binding, shown in graph 601(a), and the biotin binding signal 712 when the bulk effect minimization method was applied in graph 702(b).

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. lens, tube tens, beam-splitters, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A label-free method of detecting changes in biomass accumulating on a sensor substrate, the method comprising:
   providing the sensor substrate;
   providing a first illumination source and a second illumination source, the first illumination source generating a first light having a first central wavelength and the second illumination source generating a second light having a second central wavelength, the second central wavelength different than the first central wavelength;
   mixing the first light with the second light to produce a combined light, such that the combined light has a weighted spectrum corresponding to a bulk effect minimization wavelength of an analyte solution;
   providing the analyte solution on the sensor substrate;
   reflecting incident light of the combined light from the sensor substrate to produce a signal;
   recording the signal with a camera to obtain a reflectance image; and
   computing a biomass accumulated on the substrate based on the reflectance image.

2. The method of claim 1, further comprising, prior to mixing the first light with the second light, determining the bulk effect minimization wavelength of the analyte solution based on a thickness and a composition of the sensor substrate and a refractive index of the analyte solution.

3. The method of claim 2, wherein the analyte solution is dimtheyl sulfoxide or phosphate buffered saline.

4. The method of claim 2, wherein the first central wavelength is longer than the bulk effect minimization wavelength, and wherein the second central wavelength is shorter than the bulk effect minimization wavelength.

5. The method of claim 2, wherein an intensity of the first illumination source and an intensity of the second illumination source are adjusted to produce the combined light such that a weighted spectrum of the combined light coincides with the bulk effect minimization wavelength.

6. The method of claim 1, wherein the sensor substrate includes two or more dielectric layers.

7. The method of claim 6, wherein the dielectric layers include a $SiO_2$ layer on a silicon chip.

8. The method of claim 1, further comprising immobilizing ligands at a spotting concentration on the sensor substrate.

9. The method of claim 1, further comprising flowing the analyte solution over the sensor substrate.

10. The method of claim 1, wherein the first illumination source and second illumination source are different color LEDs.

11. The method of claim 1, wherein the first light and the second light each have a central wavelength corresponding to one of the following standard LEDs: a blue LED having a central wavelength of 456 nm; a green LED having a central wavelength of 518 nm; a yellow LED having a central wavelength of 598 nm; or a red LED having a central wavelength 635 nm.

12. The method of claim 1, wherein the camera is a monochromatic camera.

13. The method of claim 1, wherein mixing the first light and the second light occurs within an integrating sphere.

14. A sensing apparatus configured to detect changes in biomass, comprising:
- a first illumination source configured to generate a first light having a first central wavelength;
- a second illumination source configured to generate a second light having a second central wavelength;
- an integrating sphere configured to mix the first light with the second light to produce a combined light, such that the combined light has a weighted spectrum corresponding to a bulk effect minimization wavelength of an analyte solution;
- the sensor substrate, wherein the apparatus directs the combined light toward the sensor substrate to produce a signal; and
- a camera configured to image the signal to obtain a reflectance image.

15. The apparatus of claim 14, wherein the integrating sphere includes a first port for the first illumination source and a second port for the second illumination source,
wherein the first port for the first illumination source is located on a different side of the integrating sphere from the second port for the second illumination source.

16. The apparatus of claim 14, wherein the integrating sphere includes a port containing both the first illumination source and the second illumination source.

17. The apparatus of claim 16, wherein the first illumination source and second illumination source are different color LEDs on a single multi-color LED package.

18. The apparatus of claim 14, wherein the first central wavelength is longer than the bulk effect minimization wavelength, and wherein the second central wavelength is shorter than the bulk effect minimization wavelength.

19. The apparatus of claim 14, wherein an intensity of the first illumination source and an intensity of the second illumination source are adjusted to produce the combined light.

20. The apparatus of claim 14, wherein sensor substrate includes two or more dielectric layers.

21. The apparatus of claim 20, wherein the dielectric layers include a $SiO_2$ layer on a silicon chip.

22. The apparatus of claim 14, wherein the first illumination source and second illumination source are different color LEDs.

23. The apparatus of claim 14, wherein the first light and the second light each have a central wavelength corresponding to one of the following standard LEDs: a blue LED having a central wavelength of 456 nm; a green LED having a central wavelength of 518 nm; a yellow LED having a central wavelength of 598 nm; or a red LED having a central wavelength 635 nm.

24. The apparatus of claim 14, wherein the camera is a monochromatic camera.

25. The apparatus of claim 14, wherein the apparatus further configured to determine a molecular binding affinity based on the reflectance image.

26. The apparatus of claim 25, wherein:
- the sensor substrate includes capture molecules, the capture molecules including one or more of the following: proteins, peptides, nucleic acids, other biological molecules; and
- analytes within the analyte solution, the analytes including one or more of the following: proteins, peptides, nucleic acids, macromolecules, vesicles, enzymes, hormones, or drug molecules.

* * * * *